(12) United States Patent
Hirabayashi et al.

(10) Patent No.: US 8,831,499 B2
(45) Date of Patent: Sep. 9, 2014

(54) THERMALLY CONDUCTIVE SILICONE RUBBER SPONGE COMPOSITION AND FIXING ROLL

(75) Inventors: Satao Hirabayashi, Annaka (JP); Nobumasa Tomizawa, Annaka (JP); Noriyuki Meguriya, Annaka (JP)

(73) Assignee: Shin-Etsu Chemical Co., Ltd., Tokyo (JP)

( * ) Notice: Subject to any disclaimer, the term of this patent is extended or adjusted under 35 U.S.C. 154(b) by 108 days.

(21) Appl. No.: 13/332,437

(22) Filed: Dec. 21, 2011

(65) Prior Publication Data

US 2012/0161066 A1     Jun. 28, 2012

(30) Foreign Application Priority Data

Dec. 22, 2010 (JP) ................. 2010-285605

(51) Int. Cl.
| | |
|---|---|
| *G03G 15/20* | (2006.01) |
| *B32B 5/30* | (2006.01) |
| *C08G 77/04* | (2006.01) |
| *C08J 9/32* | (2006.01) |
| *C08K 7/22* | (2006.01) |
| *C08L 83/04* | (2006.01) |
| *C08J 9/00* | (2006.01) |
| *C08G 77/20* | (2006.01) |
| *C08G 77/12* | (2006.01) |

(52) U.S. Cl.
CPC ............ *G03G 15/2017* (2013.01); *C08G 77/20* (2013.01); *G03G 2215/2051* (2013.01); *C08J 9/32* (2013.01); *C08J 2383/07* (2013.01); *C08J 2483/05* (2013.01); *C08K 7/22* (2013.01); *C08K 2201/001* (2013.01); *C08L 83/04* (2013.01); *C08J 9/0061* (2013.01); *C08J 2201/026* (2013.01); *C08J 9/0066* (2013.01); *C08G 77/12* (2013.01)
USPC ........ 399/333; 399/330; 399/331; 428/314.4; 428/314.8; 428/317.9; 521/154; 524/588

(58) Field of Classification Search
USPC ................ 428/319.3, 319.9, 314.8, 317.9; 399/330, 331, 333; 521/54, 88, 134, 521/154; 524/439, 442, 588
See application file for complete search history.

(56) References Cited

U.S. PATENT DOCUMENTS

| | | | |
|---|---|---|---|
| 5,246,973 A | | 9/1993 | Nakamura et al. |
| 5,750,581 A | | 5/1998 | Brennenstuhl et al. |
| 6,261,214 B1 | | 7/2001 | Meguriya |
| 6,333,364 B2 | | 12/2001 | Meguriya et al. |
| 2004/0132890 A1* | | 7/2004 | Oka et al. ............ 524/492 |
| 2007/0135555 A1* | | 6/2007 | Hirabayashi et al. ...... 524/492 |

FOREIGN PATENT DOCUMENTS

| | | |
|---|---|---|
| JP | 5-209080 A | 8/1993 |
| JP | 9-137063 A | 5/1997 |
| JP | 2001-220510 A | 8/2001 |
| JP | 3274071 B2 | 4/2002 |
| JP | 3494039 B2 | 2/2004 |
| JP | 2006-265340 A | 10/2006 |

* cited by examiner

*Primary Examiner* — Hai Vo
(74) *Attorney, Agent, or Firm* — Birch, Stewart, Kolasch & Birch, LLP

(57) ABSTRACT

A thermally conductive silicone rubber sponge composition which is composed of 100 parts by weight of heat-curable organopolysiloxane composition, 0.1 to 50 parts by weight of organic resin hollow filler having an average particle diameter of up to 200 μm and a true specific gravity of up to 0.3, and 20 to 300 parts by weight of thermally conductive filler having an average particle diameter of 1 to 30 μm and a thermal conductivity of at least 15 W/m·K, with the highly thermally conductive silicone rubber sponge having voids accounting for 10 to 70% of the entire volume thereof. The silicone rubber sponge composition of the present invention gives a silicone rubber sponge having high thermal conductivity, small heat capacity, low hardness, light weight, and low permanent compression set.

7 Claims, No Drawings

THERMALLY CONDUCTIVE SILICONE RUBBER SPONGE COMPOSITION AND FIXING ROLL

CROSS-REFERENCE TO RELATED APPLICATION

This non-provisional application claims priority under 35 U.S.C. §119(a) on Patent Application No. 2010-285605 filed in Japan on Dec. 22, 2010, the entire contents of which are hereby incorporated by reference.

TECHNICAL FIELD

The present invention relates to a thermally conductive silicone rubber sponge composition which gives a silicone rubber sponge (cured product) having high thermal conductivity, small heat capacity, good rubber elasticity, low hardness, light weight, and high resistance to permanent compression set. The composition cures into a highly thermally conductive silicone rubber sponge suitable for a fixing roll of a thermal fixing device in an electrostatic recording apparatus such as electrophotographic copiers, printers, and facsimiles. The present invention also relates to a fixing roll having thereon a layer of the silicone rubber sponge in its cured form.

BACKGROUND ART

In the present invention, the terms "silicone rubber sponge composition" and "silicone rubber sponge (cured product)" imply respectively a cellular rubber composition having interstices originating from an organic resin hollow filler and a cured product of the cellular rubber composition. They may occasionally be replaced by the synonymous terms "silicone rubber foam composition" and "silicone rubber foam," respectively.

Liquid silicone rubber compositions of heat-curable type find use in a variety of fields because of their good moldability and their ability to form, cured products (silicone rubbers) after molding having excellent heat resistance and electrical insulating properties. Among such compositions are those having a low specific gravity which are required in many fields on account of their possible contribution to size and weight reduction. They are widely used for the toner fixing roll of the electrophotographic image forming device such as PPC, LBP, and FAX because of their excellent heat resistance and mold release characteristics. The devices that employ the electrophotographic process need a step of fixing the toner image to copy paper after its transfer from the surface of the photosensitive body to copy paper. Usually, the fixing of toner images takes place as copy paper passes through the gap between a heating roll and a pressing roll which rotate pushing each other. This rolling step causes the toner to fix onto copy paper by heat fusion. The heat fusion method permits the copying machine or printer to respond rapidly if the roll is made of a material with high thermal conductivity. Unfortunately, such a material is liable to rapid heat dissipation which is not desirable for size reduction and cost saving. This has stimulated a new demand for a material having a low thermal conductivity or excelling in heat storing characteristics. Such a material is disclosed in JP-A H05-209080 (Patent Document 1). It contains a solid filler of organic resin which expands upon heating. Unfortunately, it involves difficulties in molding (such as lack of foam uniformity) because it relies on in-mold expansion. There is disclosed a liquid silicone rubber composition for incorporated with hollow (expanded) plastic particles, in JP-A H09-137063 (Patent Document 2).

Patent Document 2 mentions that the composition may contain an optional inorganic filler such as fumed silica, precipitated silica, quartz powder, and diatomaceous earth. However, Document 2 mentions nothing about the filler for its amount, thermal conductivity, and heat capacity. In fact, it merely gives an example that treats vapor phase method (fumed silica). Fumed silica and precipitated silica are not desirable fillers because they tend to produce an adverse effect on permanent compression set although they can impart strength to silicone rubber. This holds true particularly in the case of gas-containing low-specific gravity silicone rubber (in sponge form). Among other low-specific gravity materials for the toner fixing roll are those incorporated with an expanded hollow filler, which are disclosed in Japanese Patent Nos. 3274071 and 3494039 (Patent Documents 3 and 4). The former only discloses carbon black as an inorganic filler, and the latter only discloses (without details) silica finer powder, calcium carbonate, or iron oxide as an optional component (with fumed silica alone used in Examples). There is disclosed in JP-A 2001-220510 (Patent Document 5) a material superior in permanent compression set which is incorporated with an expanded organic resin filler in combination with a polyhydric alcohol. This disclosure merely mentions the inorganic filler as an optional component and gives Examples which employ fumed silica alone.

The recent requirement for printers with a higher throughput has led to an instance in which sufficient heating is not achieved by the toner melting mechanism alone (such as heater-containing roll or belt, ceramic heater, and IH heater).

The above-mentioned sponge roll of low thermal conductivity type, which is used as a "pressing sponge roll" to be pressed against the toner melting mechanism, suffers the disadvantage of rapidly decreasing in the surface temperature because of its low thermal conductivity once it has its heat taken away from its printing surface in contact with copy paper. This disadvantage leads to the change in roll diameter or the roll lacking uniform outside diameter.

Although the foregoing is not the case with a pressing roll of unexpanded solid rubber with high thermal conductivity (which has no hollow parts unlike sponge), the pressing roll of solid rubber suffers the disadvantage of requiring a large amount of thermal energy to heat it entirely to the toner melting temperature. The result is an extended warm-up time for print starting. Therefore, the pressing roll should ideally be made of a rubber having a high thermal conductivity and a small heat capacity.

SUMMARY OF THE INVENTION

The present invention was completed in view of the foregoing. It is an object of the present invention to provide a thermally conductive silicone rubber sponge composition and also to a fixing roll with a layer of the composition in its cured form. Upon curing, the composition gives rise to a silicon rubber suitable for use as a thermal fixing roll having a high thermal conductivity and a small heat capacity.

In order to address the above-mentioned problems, the present inventors carried out extensive studies on a silicone rubber sponge composition and a cured product (silicone rubber sponge) thereof, the composition being composed of solid silicone rubber and a previously expanded organic resin hollow filler having a prescribed particle diameter. The results of the studies revealed that the object is achieved if a silicone rubber is incorporated with an organic resin hollow filler having an average particle diameter of up to 200 μm and a true specific gravity of up to 0.3 and a thermally conductive powdery filler having an average particle diameter of 1 to 30 μm and a thermal conductivity of at least 15 W/m·K. The composition specified above cures into a highly thermally conductive silicone rubber sponge having a small heat capacity. The silicone rubber sponge is suitable for the fixing roll of toner fusion type which is installed in the electrophotographic image forming apparatus.

Thus, the present invention provides the following thermally conductive silicone rubber sponge composition and the following fixing roll which has a layer of the silicone rubber sponge as a cured product of the composition.

[1] A thermally conductive silicone rubber sponge composition comprising
100 parts by weight of a heat-curable organopolysiloxane composition,
0.1 to 50 parts by weight of an organic resin hollow filler having an average particle diameter of up to 200 μm and a true specific gravity of up to 0.3, and
20 to 300 parts by weight of a thermally conductive filler having an average particle diameter of 1 to 30 μm and a thermal conductivity of at least 15 W/m·K,
a highly thermally conductive silicone rubber sponge obtained by curing the silicone rubber sponge composition having voids accounting for 10 to 70% of the entire volume thereof.

[2] The thermally conductive silicone rubber sponge composition of [1], wherein the heat-curable organopolysiloxane composition consists of:
(A) 100 parts by weight of an organopolysiloxane having at least two alkenyl groups bonded to silicon atoms in one molecule;
(B) 0.1 to 50 parts by weight of an organohydrogenpolysiloxane having at least two hydrogen atoms bonded to silicon atoms in one molecule; and
(C) a platinum group metal catalyst as an addition reaction catalyst in an amount of 0.5 to 1,000 ppm in terms of platinum group metal for the total amount by weight of components (A) and (B).

[3] The thermally conductive silicone rubber sponge composition of [1] or [2], wherein the organic resin hollow filler is formed from a polymer obtained by polymerizing or copolymerizing one or more monomers selected from the group consisting of vinylidene chloride, acrylonitrile, methacrylonitrile, acrylates and methacrylates.

[4] The thermally conductive silicone rubber sponge composition of any one of [1] to [3], wherein the thermally conductive filler is metallic silicon powder.

[5] The thermally conductive silicone rubber sponge composition of any one of [1] to [4], further comprising 1 to 30 parts by weight of a polyhydric alcohol or a derivative thereof per 100 parts by weight of component (A).

[6] The thermally conductive silicone rubber sponge composition of any one of [1] to [5], wherein the silicone rubber sponge obtained by curing the silicone rubber sponge composition has a thermal conductivity of at least 0.15 W/m·K, and a cured product obtained by curing a silicone rubber composition having the same formulation as in the silicone rubber sponge composition except that the organic resin hollow filler is not incorporated has a thermal conductivity of at least 0.3 W/m·K.

[7] The thermally conductive silicone rubber sponge composition of any one of [1] to [6], wherein the silicone rubber sponge obtained by curing the silicone rubber sponge composition has a heat capacity of up to 1.4 J/K.

[8] The thermally conductive silicone rubber sponge composition of any one of [1] to [7], which is used for a toner fixing roll installed in an image forming apparatus of electrophotographic type.

[9] A thermal fixing roll having a layer of silicone rubber sponge formed on the peripheral surface of a roll shaft, wherein said layer of silicone rubber sponge is formed by curing the thermally conductive silicone rubber sponge composition of any one of [1] to [8].

[10] A fluoroplastic-coated fixing roll having a fluoroplastics-coated layer through a layer of silicone rubber sponge on the peripheral surface of a roll shaft, wherein said layer of silicone rubber sponge is one which is formed by curing the thermally conductive silicone rubber sponge composition of any one of [1] to [8].

ADVANTAGEOUS EFFECTS OF THE INVENTION

The thermally conductive silicone rubber sponge composition according to the present invention imparts a silicone rubber sponge having a high thermal conductivity as well as a small heat capacity. In addition, the resulting silicone rubber sponge is low in hardness, light in weight, and small in permanent compression set.

DESCRIPTION OF THE EMBODIMENTS

According to the present invention, the thermally conductive silicone rubber sponge composition is composed of a heat-curable organopolysiloxane composition, an organic resin hollow filler and a thermally conductive filler.

The heat-curable organopolysiloxane composition consists of:
(A) 100 parts by weight of an organopolysiloxane containing at least two alkenyl groups bonded to silicon atoms in one molecule;
(B) 0.1 to 50 parts by weight of an organohydrogenpolysiloxane containing at least two hydrogen atoms bonded to silicon atoms (i.e., SiH groups) in one molecule; and
(C) a platinum group metal catalyst as an addition reaction catalyst in an amount of 0.5 to 1,000 ppm in terms of platinum group metal for the total amount by weight of components (A) and (B).

A detailed description of the heat-curable organopolysiloxane composition is given below.

The component (A) is an organopolysiloxane containing at least two (on average) alkenyl groups in one molecule. This component is the major constituent (or the base polymer) of the composition of the present invention. The organopolysiloxane is represented by the following average compositional formula (1).

$$R^1_a SiO_{(4-a)/2} \qquad (1)$$

wherein, $R^1$ is mutually identical or different, unsubstituted or substituted monovalent hydrocarbon groups each having a carbon number of 1 to 10, preferably 1 to 8; and letter a is a positive number ranging from 1.5 to 2.8, preferably from 1.8 to 2.5, more preferably from 1.95 to 2.05. The unsubstituted or substituted monovalent hydrocarbon group represented by $R^1$, which bonds to the silicon atom, is exemplified by alkyl group such as methyl group, ethyl group, propyl group, isopropyl group, butyl group, isobutyl group, tert-butyl group, pentyl group, neopentyl group, hexyl group, cyclohexyl group, octyl group, nonyl group, and decyl group, aryl group such as phenyl group, tolyl group, xylyl group, and naphthyl group, aralkyl group such as benzyl group, phenylethyl group, and phenylpropyl group, and alkenyl group such as vinyl group, allyl group, propenyl group, isopropenyl group, butenyl group, hexenyl group, cyclohexenyl group, and octenyl group, and the substituted groups in which the hydrogen atoms in the groups are partly or entirely replaced by halogen atoms such as fluorine, bromine, and chlorine or cyano groups, for example, chloromethyl group, chloropropyl group, bromoethyl group, trifluoropropyl group, and cyanoethyl group. At least two of the groups represented by $R^1$ should be alkenyl groups (having a carbon number of 2 to 8, preferably 2 to 6). Incidentally, the content of the alkenyl group should preferably be 0.005 to 20 mol %, particularly 0.01 to 10 mol %, of the unsubstituted or substituted monovalent hydrocarbon group represented by $R^1$. This alkenyl group may bond to the silicon atoms at the terminals of the molecular chain or the silicon atoms within the molecular chain, or both. However, it should preferably bond to the silicon atoms at the terminals of the molecular chain.

The above-mentioned organopolysiloxane is basically a diorganopolysiloxane of straight-chain structure in which the backbone chain is usually composed of diorganosiloxane units (represented by $(R^1)_2SiO_{2/2}$ unit) and both terminals of the molecular chain are blocked with triorganosiloxy groups (represented by $(R^1)_3SiO_{1/2}$ unit). However, it may partly have a branched or cyclic structure containing $R^1SiO_{3/2}$ units or $SiO_{4/2}$ units. The substituent groups on the silicon atom may basically be any one of the groups listed above, although the desirable alkenyl group is vinyl group and the other desirable substituent groups are methyl group and phenyl group.

The organopolysiloxane is not specifically restricted in molecular weight; it may take on various forms ranging from liquid with a low viscosity to raw rubber with a high viscosity. It should have a viscosity of at least 100 mPa·s, usually from 100 to 1,000,000 mPa·s, particularly from 500 to 100,000 mPa·s at 25° C. so that it changes into a rubbery elastic solid upon curing. Incidentally, the viscosity specified in the present invention is usually measured by using a rotary viscometer. The alkenyl group-containing organopolysiloxane should preferably have a degree of polymerization (in terms of the number of silicon atoms in the molecule) of at least 70, usually from 70 to 10,000, particularly 200 to 2,000, for the same reason as mentioned above. The degree of polymerization may be determined by gel permeation chromatography (GPC) using toluene as the solvent, and it may be represented by weight average degree of polymerization (Nw) in terms of polystyrene. The alkenyl group-containing organopolysiloxane may be used alone or in combination with two or more.

The component (B), which is an organohydrogenpolysiloxane, reacts with the component (A) while functioning as a crosslinking agent. It is not specifically restricted in its molecular structure. It is commercially available in the linear, cyclic, branched, or three-dimensional network structure (resin form). It should have at least two, preferably three or more, hydrogen atoms (or hydrosilyl groups represented by Si—H) bonding to the silicon atom in the molecule. The number of the Si—H groups is usually 2 to 300, preferably 3 to 200, and more preferably 4 to 100. The organohydrogenpolysiloxane used in the present invention is one which is represented by the average compositional formula (2) shown below.

$$R^2{}_bH_cSiO_{(4-b-c)/2} \qquad (2)$$

wherein, $R^2$ is preferably a $C_{1-10}$ unsubstituted monovalent hydrocarbon group bonding to silicon atom (excluding aliphatic unsaturated linkage such as alkenyl group). The unsubstituted monovalent hydrocarbon group as $R^2$ includes alkyl groups such as methyl group, ethyl group, propyl group, isopropyl group, butyl group, isobutyl group, tert-butyl group, pentyl group, neopentyl group, hexyl group, cyclohexyl group, octyl group, nonyl group, and decyl group, aryl groups such as phenyl group, tolyl group, xylyl group, and naphthyl group, and aralkyl groups such as benzyl group, phenylethyl group, and phenylpropyl group. The unsubstituted monovalent hydrocarbon group as $R^2$ should preferably be alkyl group or aryl group, more preferably methyl group or phenyl group, which are desirable from the standpoint of flame retardancy. In addition, letter b is a positive number ranging from 0.7 to 2.1 and letter c is a positive number ranging from 0.001 to 1.0 with b+c being 0.8 to 3.0, and preferably b is 1.0 to 2.0 and c is 0.01 to 1.0 with b+c being 1.5 to 2.5.

The Si—H group is contained as many as two or more, preferably as many as three or more in one molecule, and may exist at the terminals of the molecular chain or within the molecular chain, or both. The organohydrogenpolysiloxane may take on any molecular structure such as linear, cyclic, branched, and three-dimensional network structure. The number of silicon atoms in one molecule (which is equivalent to the degree of polymerization) is usually 2 to 400, preferably 3 to 300, and more preferably 4 to 150, from the standpoint of the physical properties of the resulting silicone rubber and the workability of the resulting compound. The one in the form of liquid at room temperature (25° C.) is desirable which has a viscosity of usually 0.1 to 1,000 mPa·s, preferably 0.5 to 500 mPa·s, and more preferably 5 to 300 mPa·s at 25° C.

Examples of the organohydrogenpolysiloxane represented by the average compositional formula (2) typically includes 1,1,3,3-tetramethyldisiloxane,
1,3,5,7-tetramethylcyclotetrasiloxane,
tris(hydrogendimethylsiloxy)methylsilane,
tris(hydrogendimethylsiloxy)phenylsilane,
methylhydrogencyclopolysiloxane,
methylhydrogensiloxane-dimethylsiloxane cyclic copolymer,
methylhydrogenpolysiloxane with both terminals blocked with trimethylsiloxy groups,
dimethylsiloxane-methylhydrogensiloxane copolymer with both terminals blocked with trimethylsiloxy groups,
dimethylpolysiloxane with both terminals blocked with dimethylhydrogensiloxy groups,
dimethylsiloxane-methylhydrogensiloxane copolymer with both terminals blocked with dimethylhydrogensiloxy groups,
methylhydrogensiloxane-diphenylsiloxane copolymer with both terminals blocked with trimethylsiloxy groups,
methylhydrogensiloxane-diphenylsiloxane-dimethylsiloxane copolymer with both terminals blocked with trimethylsiloxy groups,
methylhydrogensiloxane-methylphenylsiloxane-dimethylsiloxane copolymer with both terminals blocked with trimethylsiloxy groups,
methylhydrogensiloxane-dimethylsiloxane-diphenylsiloxane copolymer with both terminals blocked with dimethylhydrogensiloxy groups,
methylhydrogensiloxane-dimethylsiloxane-methylphenylsiloxane copolymer with both terminals blocked with dimethylhydrogensiloxy groups,
copolymer composed of $(CH_3)_2HSiO_{1/2}$ units, $(CH_3)_3SiO_{1/2}$ units, and $SiO_{4/2}$ units,
copolymer composed of $(CH_3)_2HSiO_{1/2}$ units and $SiO_{4/2}$ units, and
copolymer composed of $(CH_3)_2HSiO_{1/2}$ units, $SiO_{4/2}$ units, and $(C_6H_5)SiO_{3/2}$ units.

The amount of the organohydrogenpolysiloxane in the compound should be 0.1 to 50 parts by weight, preferably 0.3 to 30 parts by weight for 100 parts by weight of the component (A).

The amount of the organohydrogenpolysiloxane may also be expressed in terms of molar ratio of Si—H groups (or hydrogen atoms bonded to silicon atoms) in the component (B) to alkenyl groups bonded to silicon atoms in the component (A). Such a molar ratio should be from 0.5 to 5 mol/mol, preferably from 0.8 to 4 mol/mol, and more preferably from 0.8 to 2.5 mol/mol.

The organohydrogenpolysiloxane may be used alone or in combination with two or more.

The component (C), which is a catalyst for addition reaction, is intended to promote the hydrosilylating addition reaction between the alkenyl group in the component (A) and the Si—H group in the component (B). The catalyst for addition reaction includes, for example, platinum group catalysts including platinum catalysts such as platinum black, platinic chloride, chloroplatinic acid, reaction product of chloroplatinic acid and monohydric alcohol, complex of chloroplatinic acid and olefin, and platinum bisacetoacetate, palladium catalysts and rhodium catalysts. The amount of the catalyst for addition reaction should be usually 0.5 to 1,000 ppm, preferably 1 to 500 ppm (in terms of platinum group metal) for the total amount of the components (A) and (B).

According to the present invention, the heat-curable organopolysiloxane composition is incorporated with an organic resin hollow filler as component (D). The organic resin hollow filler is one which is formed by foaming an organic resin to a prescribed particle diameter. Owing to the gas contained therein, the hollow filler decreases the resulting rubber in thermal conductivity to the same level as that of rubber sponge. The hollow filler may be those of phenolic resin balloon, acrylonitrile balloon, vinylidene chloride balloon, and alumina balloon. Preferable balloons are those formed from a polymer obtained by polymerizing or copolymerizing one or more monomers selected from the group consisting of vinylidene chloride, acrylonitrile, methacrylonitrile, acrylates, and methacrylates. The hollow filler may have surface coating with an inorganic filler for reinforcement. For the silicone rubber composition to sufficiently decrease in thermal conductivity, the hollow filler should have a true specific gravity of 0.01 to 0.3, preferably 0.02 to 0.2. The one having a value smaller than 0.01 is difficult to handle for compounding and is liable to break at the time of forming on account of insufficient compression strength. Thus, the reduction of weight and the thermal conductivity cannot be realized. The one having a value larger than 0.3 is not effective in weight reduction, with void ratio remaining low, on account of large shell thickness. The hollow filler should have an average particle diameter of up to 200 μm, preferably from 5 to 150 μm. Particles larger than 200 μm are subject to breakage under injection pressure at the time of molding, resulting in high thermal conductivity, reduced rubber strength, and rough roll surface after roll molding. Particles smaller than 5 μm do not give the intended void ratio due to insufficient gas contained therein. Incidentally, the average particle diameter is usually expressed in terms of cumulative weight mean diameter $D_{50}$ (or median diameter) in particle size distribution measured by laser beam diffractometry. The organic resin hollow filler may be used alone or in combination with two or more.

The organic resin hollow filler may be selected from commercially available ones as listed in Table 1 to be described later.

The amount of the component (D) should be 0.1 to 50 parts by weight, preferably 0.3 to 25 parts by weight, more preferably 0.5 to 10 parts by weight for 100 parts by weight of the heat-curable organopolysiloxane composition, so that the resulting composition preferably has a void volume ratio of 10 to 70%. An amount less than 0.1 parts by weight is not enough to reduce thermal conductivity sufficiently. An amount in excess of 50 parts by weight presents difficulties in molding and composition processing and leads to a composition which would give a brittle product lacking rubbery elasticity.

Next, a description will be given of the thermally conductive filler (E) used in the present invention.

The composition according to the present invention is incorporated with a thermally conductive filler as the component (E) described below, so that the resulting sponge composition has thermal conductivity.

The thermally conductive filler is not specifically restricted so long as it has a thermal conductivity of at least 15 W/m·K. It not only imparts thermal conductivity to the cured rubber but also contributes to the rubber strength on account of its particulate structure.

The thermally conductive filler should have a thermal conductivity of at least 15 W/m·K, preferably at least 20 W/m·K. This requirement is met by any one of metallic silicon powder (168 W/m·K), silver powder (430 W/m·K), copper powder (390 W/m·K), nickel powder (91 W/m·K), metallic aluminum powder (236 W/m·K), iron powder (84 W/m·K), silicon carbide powder (46 W/m·K), zinc oxide powder (54 W/m·K), and alumina powder (21 W/m·K).

The upper limit of the thermal conductivity is 800 W/m·K or less, particularly 500 W/m·K or less.

Any filler with a thermal conductivity lower than 15 W/m·K needs to be added in a large amount to the silicone rubber composition, which results in the uncured composition greatly increasing in viscosity (to become incapable of kneading) and the cured rubber lacking the prescribed thermal conductivity.

The thermally conductive filler should have an average particle diameter of 1 to 30 μm, preferably 2 to 20 μm, more preferably 3 to 15 μm. Under 1 μm, it aggravates the permanent compression set, and over 30 μm, it aggravates the rubber strength, decreasing the roll durability. The average particle diameter is usually expressed in terms of cumulative weight mean diameter $D_{50}$ (or median diameter) in particle size distribution measured by laser beam diffractometry. The thermally conductive filler may be used alone or in combination with two or more.

Of the above-mentioned examples, metallic silicon powder is particularly desirable because it is light in weight with a low density of 2.33 g/cm$^3$ among other thermally conductive fillers, good in thermal conductivity with a low heat capacity of 1.7 J/g·K, and so soft with a Mohs hardness of about 5 as not to damage the organic resin hollow filler. In addition, the metallic powder hardly agglomerates under high shear because silicon is a hardly malleable metal. This means that it can be obtained easily by pulverization without precipitation and can be easily dispersed into the organopolysiloxane. It has the property that its surface is naturally coated with silicon oxide film which is resistant to heat, acid, staining, and electric current, like glass film. It is stable against heat. The natural silicon oxide film is free of defects and stable to high-temperature heat if it is formed on high-purity metallic silicon powder.

The thermally conductive filler may be used alone or in combination with two or more.

The thermally conductive powder may be produced in any way without specific restrictions. That of metal oxide may be produced by baking (for oxidation) a metal hydroxide or a metal salt or by directly oxidizing a metal at high temperatures. Metallic filler may be produced by crushing a metal in an existing breaker or a crusher such as a ball mill or by pulverizing chip powder followed by classification. It may also be produced by atomizing molten metal in the gas phase, followed by cooling and solidifying. Atomization yields smooth spherical particles having no sharply-peaked edges, with an aspect ratio of usually from 1.0 to 1.4, preferably from 1.0 to 1.2 (which is the ratio of the major axis to the minor axis). Another method includes coating with a metal film on metal particles, resin particles, or silica particles by plating, vapor deposition, or melting. The resulting metal film may be of single-crystal or polycrystal.

The thermally conductive filler mentioned above may be surface-treated with a silane coupling agent or its partial hydrolyzate, an alkylalkoxysilane or its partial hydrolyzate, an organic silazane, a titanate coupling agent, an organopolysiloxane oil, or an organopolysiloxane having hydrolyzable functional groups. This surface treatment may be accomplished previously or at the time of mixing with a coupling agent or oil.

The amount of the component (E) should be 20 to 300 parts by weight, preferably 20 to 200 parts by weight, more preferably 30 to 150 parts by weight for 100 parts by weight of the heat-curable organopolysiloxane composition. An amount less than 20 parts by weight is not enough for the resulting rubber composition to exhibit satisfactory thermal conductivity, with the result that the roll made thereof fluctuates in temperature. An amount in excess of 300 parts by weight aggravates the composition processing and makes the resulting rubber sponge poor in permanent compression set.

The thermally conductive filler may be mixed at room temperature with the components (A) and (B) by using a device such as a planetary mixer and kneader. Mixing may be followed by heating at 100 to 200° C.

According to the present invention, the thermally conductive silicone rubber sponge composition may be incorporated with, as an optional additive (F) for the purpose of reducing permanent compression set, polyhydric alcohol such as glycerin, ethylene glycol, propylene glycol, pentaerythritol, glycerin-α-monochlorohydrin; an oligomer (dimer or trimer) of polyhydric alcohol such as diethylene glycol, triethylene glycol, and dipropylene glycol; polymer of polyhydric alcohol such as polyethylene glycol, polypropylene glycol, and crown ether, or copolymer of two or more of the polyhydric alcohols; partially etherified product such as ethylene glycol monoethyl ether, ethylene glycol monophenyl ether, diethylene glycol monomethyl ether, and dipropylene glycol monoethyl ether; partially esterified product such as glycerin monoacetate, glycerin diacetate, and ethylene glycol monoacetate; and partially silylated product.

The component (F) may be incorporated in an amount of 30 parts by weight or lower (i.e., 0 to 30 parts by weight) for 100 parts by weight of the component (A). When component (F) is incorporated, the amount of the component (F) may be 1 to 30 parts by weight, preferably 3 to 20 parts by weight for 100 parts by weight of the component (A). An amount in excess of 30 parts by weight is detrimental to the physical properties of the rubber.

Moreover, the thermally conductive silicone rubber sponge composition may be incorporated further with known components such as any inorganic powder as heat-resistant agent including iron oxide powder and cerium oxide, reinforcing silica including fumed silica and precipitated silica, and flame retardant agent including spherical silica and aluminum hydroxide other than the above-mentioned thermally conductive filler. The amount of the inorganic powder should be low enough not to deteriorate the low permanent compression set and the roll durability, which are the characteristic properties of the composition of the present invention. The total amount of the fumed silica and precipitated silica, which greatly affect permanent compression set, should be up to 5 parts by weight (including 0), preferably up to 3 parts by weight (including 0), for 100 parts by weight of the component (A).

The silicone rubber sponge composition according to the present invention may be produced by evenly mixing together the above-mentioned components sequentially or all at once by using ordinary mixing means. A preferred procedure includes preliminarily mixing part of the component (A) and the component (D) and then mixing the premix with the remainder of the component (A) and the component (E). Mixing in this manner gives rise to uniform cells. The remaining components may be added to either or both of the individual mixtures or the combination of the individual mixtures.

The silicone rubber sponge composition according to the present invention may be cured by any of cast molding, compression molding, injection molding, and coating. Curing should be accomplished at 100 to 300° C. for ten seconds to one hour. Curing may be followed by post-curing (or secondary curing) at 120 to 250° C. for 30 minutes to 70 hours in order to break the organic resin hollow filler, to reduce permanent compression set, or to decrease the content of low-molecular siloxane components.

The silicone rubber sponge composition according to the present invention is cured to form a cured product having a thermal conductivity of at least 0.15 W/m·K, preferably at least 0.18 W/m·K, more preferably at least 0.20 W/m·K. The thermal conductivity of less than 0.15 W·K (is close to that of ordinary silica-filled rubber sponge (about 0.10 W/m·K). The rubber sponge with such a low thermal conductivity is unable to equalize the temperature variation in the axial direction of the roll. It is to be noted that the upper limit is usually 3.0 W/m·K or less.

The thermally conductive silicone rubber in its cured form without the organic resin hollow filler (that is, without the sponge-like hollow portion) should have a thermal conductivity of at least 0.3 W/m·K, preferably at least 0.35 W/m·K, and more preferably at least 0.4 W/m·K. The silicone rubber in its solid state should have a high thermal conductivity so that it eliminates temperature variation in the axial direction of the roll. Moreover, the highly thermally conductive silicone rubber can accept the organic resin hollow filler in a large amount (thereby increasing in expanding ratio or void ratio) and hence decrease in heat capacity. It is to be noted that the upper limit is usually 10 W/m·K or less.

The thermally conductive silicone rubber sponge composition according to the present invention should have, in its cured form, a heat capacity of up to 1.4 J/K, preferably up to 1.2 J/K, and more preferably up to 1.0 J/K. The smaller the heat capacity of the sponge becomes, the less the amount of heat required to heat the entire pressing roll to the temperature for toner fusion becomes. This leads to reduction of warm-up time (the period for the first print to come out). A heat capacity larger than 1.4 J/K is close to that of non-expanded rubber, and hence it is not desirable for the rubber sponge composition characterized by a low heat capacity. It is to be noted that the lower limit is usually 0.3 J/K or more. The heat capacity of up to 1.4 J/K is achieved by (a) increasing the void volume, (b) selecting a thermally conductive filter with a low heat capacity, and (c) selecting a thermally conductive filler with a high thermal conductivity.

The thermally conductive silicone rubber sponge composition and the cured product thereof should have a void volume ratio of 10 to 70%, preferably 10 to 60%, more preferably 15 to 50% of the total sponge composition or the total cured product (sponge). With a low void volume ratio, the composition or the cured product thereof has a large heat capacity and the cured product (sponge) is hard. With a high void volume ratio, the cured product (sponge) is brittle because the organic resin hollow filler in the sponge composition has a thin cell wall or because cell walls expand close to each other. Incidentally, the void volume ratio (or the ratio of the volume of voids to the volume of the entire cured product) may be calculated by image-processing the sectional photograph of the cured product (sponge), by calculating the ratio of the density of the cured product (sponge) to the density of the solid rubber composition (excluding the organic resin hollow filler from the rubber sponge composition), or by calculating the ratio of the density of the rubber sponge composition to the density of the solid rubber composition, excluding the organic resin hollow filler from the rubber sponge composition. In the case of the silicone rubber sponge composition according to the present invention, the void volume ratio of the sponge composition and the void volume ratio of the cured product (sponge) are substantially equal to each other because the solid rubber composition (in unvulcanized state) and the solid rubber cured product (after curing) have substantially the same density. The void volume ratio of the cured product (sponge) can be calculated from the formula below.

[1−(density of sponge rubber(cured product) containing the organic resin hollow filler)/(density of solid rubber(cured product))]×100(vol %)

The fixing roll according to the present invention is completed by covering a metal core (of stainless steel, iron, nickel, or aluminum) with a layer of the cured product of the silicone rubber sponge composition. The metal core may vary in material and dimension depending on the type of the roll. The layer of silicone rubber sponge may be molded in various ways, such as cast molding, transfer molding, injection molding, and coating, and is cured by heating. The layer of silicone rubber sponge may be covered with a fluoroplastic layer or fluororubber layer. The fluoroplastic layer may be formed by coating with a fluoroplastic or by slipping on a fluoroplastic tube to cover the silicone rubber layer. The coating material of fluoroplastic includes, for example, latex of polytetrafluoroethylene resin (PTFE) and Dai-L Latex (fluoroplastic latex from Daikin Industries, Ltd.). The fluoroplastic tube may be selected from commercially available ones for example made of polytetrafluoroethylene resin (PTFE), tetrafluoroethylene-perfluoroalkyl vinyl ether copolymer resin (PFA), fluorinated ethylene-polypropylene copolymer resin (FEP), poly-fluorinated-vinylidene resin (PVDF), and poly-fluorinated-vinyl resin. Preferable among these examples is PFA.

The layer of silicone rubber sponge may have any adequate thickness, for example, 0.05 to 80 mm, preferably 0.1 to 50 mm, which permits the silicone rubber sponge to exhibit its rubbery elasticity. The fluoroplastic layer or the fluororubber layer as the top layer should have a thickness of 5 to 200 μm, preferably 10 to 100 μm.

EXAMPLES

The invention will be described in more detail with reference to the following Examples, which are not intended to restrict the scope thereof. Incidentally, the degree of polymerization of organopolysiloxane is represented by weight-average degree of polymerization (Nw) in terms of polystyrene, which is determined by gel permeation chromatography (GPC) using toluene as the solvent. Table 1 shows the organic resin hollow filler used in the Examples and Table 2 shows the thermally conductive filler used in the Examples.

TABLE 1

Organic resin hollow fillers used in Examples and Comparative Examples

| Organic resin hollow filler | Characteristic properties of filler |
| --- | --- |
| A | Expancel DE (from Akzo Nobel N.V.) with an average particle diameter of 40 μm and a true specific gravity of 0.04 |
| B | Microsphere F-80ED (from Matsumoto Yushi-Seiyaku Co., Ltd.), with an average particle diameter of 90 μm and a true specific gravity of 0.02 |
| C | Microsphere MFL-30STI (from Matsumoto Yushi-Seiyaku Co., Ltd.), of titanium oxide coated type, with an average particle diameter of 20 μm and a true specific gravity of 0.20 |

TABLE 2

Thermally conductive fillers used in Examples and Comparative Examples

| Thermally conductive filler | Characteristic properties of filler |
| --- | --- |
| Metallic silicon powder A | Crushed, with an average particle diameter of 10 μm, a thermal conductivity of 168 W/m · K for powder alone, a new Mohs hardness of 5.5, and a true specific gravity of 2.33 for powder |
| Metallic silicon powder B | Crushed, with an average particle diameter of 5 μm, a thermal conductivity of 168 W/m · K for powder alone, a new Mohs hardness of 5.5, and a true specific gravity of 2.33 for powder |
| Silicon carbide powder A | Crushed, with an average particle diameter of 10 μm, a thermal conductivity of 46 W/m · K for powder alone, a new Mohs hardness of 13, and a true specific gravity of 3.10 for powder |
| Zinc oxide powder A | Calcined, with an average particle diameter of 12 μm, a thermal conductivity of 54 W/m · K for powder alone, a new Mohs hardness of 4.5, and a true specific gravity of 5.67 for powder |
| Alumina powder A | Spherical, with an average particle diameter of 12 μm, a thermal conductivity of 21 W/m · K for powder alone, a new Mohs hardness of 12, and a true specific gravity of 3.90 for powder |
| Crystalline silica powder A | Crushed, with an average particle diameter of 5 μm, a thermal conductivity of 10 W/m · K for powder alone, a new Mohs hardness of 7, and a true specific gravity of 2.60 for powder |

In the following examples, the silicone rubber sponge composition was prepared by halving the vinyl group-containing dimethylpolysiloxane and incorporating the two halves respectively with the organic resin hollow filler and the thermally conductive filler, and then subjecting the resulting two mixes to uniform mixing in a planetary mixer.

Example 1

A silicone rubber sponge composition (1) was prepared from the following components.
- 100 parts by weight of dimethylpolysiloxane (having a degree of polymerization of about 300), with both terminals blocked with dimethylvinylsiloxy groups
- 50 parts by weight of metallic silicon powder (A) having an average particle diameter of 10 μm
- 0.5 parts by weight of hydrophobized fumed silica having a specific surface area of 110 m$^2$/g ("R-972" made by Nippon Aerosil Co., Ltd.)
- 5.0 parts by weight of organic resin hollow filler (A) having a specific gravity of 0.04 and an average particle diameter of 40 μm ("Expancel DE" made by Akzo Nobel N.V.)

4.0 parts by weight of methylhydrogenpolysiloxane (1) as a crosslinking agent having Si—H groups on both terminals and side chains, having a degree of polymerization of about 17, and containing Si—H groups in an amount of 0.0030 mol/g, with the ratio of Si—H groups to alkenyl groups being 1.35

5 parts by weight of triethylene glycol 0.05 parts by weight of ethynylcyclohexanol as a reaction inhibiting agent 0.1 parts by weight of platinum catalyst (with the Pt concentration being 1 wt %)

The resulting composition was press-cured at 120° C. for ten minutes and post-cured at 200° C. for four hours. Thus there were obtained samples of silicone rubber sponge sheet, each measuring 2 mm and 6 mm in thickness. There was also obtained a specimen for permanent compression set test, measuring 12.5 mm in thickness and 29 mm in diameter.

A solid silicone rubber composition was prepared from the same components as mentioned above, excluding the organic resin hollow filler. This composition is intended for measurement of the thermal conductivity which the foregoing thermally conductive silicone rubber composition would have in its unexpanded solid state. The resulting composition was made into a solid silicone rubber sheet measuring 6 mm in thickness by curing in the same way as mentioned above.

The sample of the sheet (2 mm thick) was examined for hardness (Asker C) and tensile strength. The sample of the sheet (6 mm thick) was examined for thermal conductivity. The sample for permanent compression set test (12.5 mm thick and 29 mm in diameter) was examined for permanent compression set [25% compression, at 180° C., for 22 hours].

Incidentally, the methods for measurement of rubber density, hardness, tensile strength, and permanent compression set conform to JIS K6249, and thermal conductivity was measured by using a thermal conductivity meter "QTM-D3" (hot wire type, made by Kyoto Electronics Manufacturing Co., Ltd.). The void ratio was calculated from the formula below.

[1−(density of cured sponge rubber containing the organic resin hollow filler)/(density of cured solid rubber)]×100(vol %)

The heat capacity (J/K) of the silicone rubber sponge was calculated from the product of its specific heat (J/g·K) and its density (g/cm$^3$). The specific heat was measured by differential scanning calorimetry (DSC) under the following conditions.

Apparatus: DSC-7 made by PerkinElmer Inc.
Temperature of measurement: 40 to 200° C.
Atmosphere of measurement: Air
The results are shown in Table 3.

Example 2

The same procedure as in Example 1 was repeated to prepare a silicone rubber sponge composition (2) and a solid rubber composition, except that the amount of the organic resin hollow filler (A) was increased from 5.0 to 7.0 parts by weight. The sheet was formed to examine various properties in the same way as in Example 1. The results are shown in Table 3.

Example 3

A silicone rubber sponge composition (3) and a solid rubber composition were prepared from the following components.

80 parts by weight of dimethylpolysiloxane (having a degree of polymerization of about 600), with both terminals blocked with dimethylvinylsiloxy groups 20 parts by weight of dimethylpolysiloxane (having a degree of polymerization of 200), with both terminals blocked with trimethylsiloxy groups and having vinyl groups on the side chains (with the content of vinyl groups being 0.00045 mol/g)

110 parts by weight of metallic silicon powder (A) having an average particle diameter of 10 μm 2.5 parts by weight of organic resin hollow filler (B) having an average particle diameter of 90 μm and a true specific gravity of 0.02 ("Microsphere F-80ED" made by Matsumoto Yushi-Seiyaku Co., Ltd.)

0.5 parts by weight of ferric oxide ($Fe_2O_3$), as a heat resisting material, having an average particle diameter of 7 μm 5.0 parts by weight of methylhydrogenpolysiloxane (1) as a crosslinking agent (the same one as used in Example 1), with the ratio of Si—H groups to alkenyl groups being 1.2

3 parts by weight of ethylene glycol 0.05 parts by weight of ethynylcyclohexanol as a reaction inhibiting agent 0.1 parts by weight of platinum catalyst (with the Pt concentration being 1 wt %)

The resulting silicone rubber sponge composition (3) and the solid rubber composition were examined for various properties in the same way as in Example 1. The results are shown in Table 3.

Example 4

A silicone rubber sponge composition (4) and a solid rubber composition were prepared from the following components.

100 parts by weight of dimethylpolysiloxane (having a degree of polymerization of about 450), with both terminals blocked with trimethylsiloxy groups and having vinyl groups on the side chains (with the content of vinyl groups being 0.00011 mol/g)

80 parts by weight of metallic silicon powder (B) having an average particle diameter of 5 μm 2.0 parts by weight of organic resin hollow filler (B) ("Microsphere F-80ED")

0.5 parts by weight of ferric oxide ($Fe_2O_3$), as a heat resisting material, having an average particle diameter of 7 μm 0.5 parts by weight of fumed silica having a specific surface area of 200 m$^2$/g ("Aerosil 200" made by Nippon Aerosil Co., Ltd.)

1.4 parts by weight of methylhydrogenpolysiloxane (as a crosslinking agent) with Si—H groups bonding to only side chains, having a degree of polymerization of 25 and containing Si—H groups in an amount of 0.0069 mol/g, with the ratio of Si—H groups to alkenyl groups being 0.9

6 parts by weight of diethylene glycol monomethyl ether 0.05 parts by weight of ethynylcyclohexanol as a reaction inhibiting agent 0.1 parts by weight of platinum catalyst (with the Pt concentration being 1 wt %)

The resulting silicone rubber sponge composition (4) and the solid rubber composition were examined for various properties in the same way as in Example 1. The results are shown in Table 3.

Example 5

The same procedure as in Example 1 was repeated to prepare a silicone rubber sponge composition (5) and a solid rubber composition, except that the metallic silicon powder (A) as a thermally conductive filler was replaced by 70 parts by weight of silicon carbide powder (A) having an average particle diameter of 10 µm. The results are shown in Table 3.

Example 6

The same procedure as in Example 1 was repeated to prepare a silicone rubber sponge composition (6) and a solid rubber composition, except that the metallic silicon powder (A) as a thermally conductive filler was replaced by 140 parts by weight of zinc oxide powder (A) having an average particle diameter of 12 µm. The sheet was formed to examine various properties in the same way as in Example 1. The results are shown in Table 4.

Example 7

The same procedure as in Example 1 was repeated to prepare a silicone rubber sponge composition (7) and a solid rubber composition, except that the metallic silicon powder (A) as a thermally conductive filler was replaced by alumina powder (A) having an average particle diameter of 12 µm. The sheet was formed to examine various properties in the same way as in Example 1. The results are shown in Table 4.

Example 8

The same procedure as in Example 1 was repeated to prepare a silicone rubber sponge composition (8) and a solid rubber composition, except that the organic resin hollow filler (A) was replaced by a titanium oxide-coated organic resin hollow filler (C) having an average particle diameter of 20 µm and a true specific gravity of 0.20 ("Microsphere MFL-30STI" made by Matsumoto Yushi-Seiyaku Co., Ltd.). The sheet was formed to examine various properties in the same way as in Example 1. The results are shown in Table 4.

Comparative Example 1

A silicone rubber sponge composition (9) and a solid rubber composition were prepared from the following components by uniform mixing in a planetary mixer.
- 100 parts by weight of dimethylpolysiloxane (having a degree of polymerization of about 300), with both terminals blocked with dimethylvinylsiloxy groups
- 0.5 parts by weight of hydrophobized fumed silica having a specific surface area of 110 m$^2$/g ("R-972" made by Nippon Aerosil Co., Ltd.)
- 5.0 parts by weight of organic resin hollow filler (A) having a specific gravity of 0.04 and an average particle diameter of 40 µm ("Expancel DE" made by Akzo Nobel N.V.)
- 4.0 parts by weight of methylhydrogenpolysiloxane (1) as a crosslinking agent having Si—H groups on both terminals and side chains, having a degree of polymerization of about 17, and containing Si—H groups in an amount of 0.0030 mol/g, with the ratio of Si—H groups to alkenyl groups being 1.35
- 5 parts by weight of triethylene glycol
- 0.05 parts by weight of ethynylcyclohexanol as a reaction inhibiting agent
- 0.1 parts by weight of platinum catalyst (with the Pt concentration being 1 wt %)

The resulting compositions were examined for various properties in the same way as in Example 1. The results are shown in Table 5.

Comparative Example 2

A silicone rubber sponge composition (10) and a solid rubber composition were prepared from the following components.
- 100 parts by weight of dimethylpolysiloxane (having a degree of polymerization of about 300), with both terminals blocked with dimethylvinylsiloxy groups
- 100 parts by weight of crystalline silica powder (A) having an average particle diameter of 5 µm ("Crystallite VXS" made by Tatsumori Ltd.)
- 0.5 parts by weight of hydrophobized fumed silica having a specific surface area of 110 m$^2$/g ("R-972" made by Nippon Aerosil Co., Ltd.)
- 2.5 parts by weight of organic resin hollow filler (A) having a specific gravity of 0.04 and an average particle diameter of 40 µm
- 4.0 parts by weight of methylhydrogenpolysiloxane (1) as a crosslinking agent having Si—H groups on both terminals and side chains, having a degree of polymerization of about 17, and containing Si—H groups in an amount of 0.0030 mol/g, with the ratio of Si—H groups to alkenyl groups being 1.35
- 5 parts by weight of triethylene glycol
- 0.05 parts by weight of ethynylcyclohexanol as a reaction inhibiting agent
- 0.1 parts by weight of platinum catalyst (with the Pt concentration being 1 wt %)

The resulting compositions were examined for various properties in the same way as in Example 1. The results are shown in Table 5.

Comparative Example 3

A silicone rubber sponge composition (11) and a solid rubber composition were prepared from the following components.
- 100 parts by weight of dimethylpolysiloxane (having a degree of polymerization of about 300), with both terminals blocked with dimethylvinylsiloxy groups
- 50 parts by weight of crystalline silica powder (A) having an average particle diameter of 5 µm ("Crystallite VXS" made by Tatsumori Ltd.)
- 0.5 parts by weight of hydrophobized fumed silica having a specific surface area of 110 m$^2$/g ("R-972" made by Nippon Aerosil Co., Ltd.)
- 5.0 parts by weight of organic resin hollow filler (A) having a specific gravity of 0.04 and an average particle diameter of 40 µm
- 4.0 parts by weight of methylhydrogenpolysiloxane (1) as a crosslinking agent having Si—H groups on both terminals and side chains, having a degree of polymerization of about 17, and containing Si—H groups in an amount of 0.0030 mol/g, with the ratio of Si—H groups to alkenyl groups being 1.35
- 5 parts by weight of triethylene glycol
- 0.05 parts by weight of ethynylcyclohexanol as a reaction inhibiting agent
- 0.1 parts by weight of platinum catalyst (with the Pt concentration being 1 wt %)

The resulting compositions were examined for various properties in the same way as in Example 1. The results are shown in Table 5.

Comparative Example 4

The composition according to Comparative Example 2 underwent mixing for 30 minutes in a planetary mixer, with the amount of the crystalline silica powder (A) changed from 100 parts by weight to 120 parts by weight for improvement in thermal conductivity. However, it gave no paste product even after prolonged mixing on account of the excess filler. This suggests that the crystalline silica powder (A), which has a low thermal conductivity of 10 W/m·K, is incapable of incorporation in a larger amount than a certain limit and hence the compound with this filler has no possibility of further improvement in thermal conductivity.

For the purpose of measuring the thermal conductivity of the cured solid silicone rubber, a composition (12) for unexpanded silicone rubber (solid state) was prepared in the following way from the same components as above except that the organic resin hollow filler (A) was omitted. All the components in Comparative Example 2 excluding the organic resin hollow filler (A) and the platinum catalyst were mixed for 15 minutes, and 0.1 parts by weight of the platinum catalyst (with the Pt concentration being 1 wt %) was finally added.

The resulting silicone rubber composition (12) was made into a rubber sheet (6 mm thick), which was examined only for thermal conductivity in its solid state. The results are shown in Table 5.

Comparative Example 5

The composition according to Comparative Example 2 underwent mixing for 30 minutes in a planetary mixer, with the amount of the organic resin hollow filler (A) changed from 2.5 parts by weight to 3.5 parts by weight for improvement in the void ratio of sponge. However, it gave no paste product even after prolonged mixing on account of the excess filler. This suggests that the organic resin hollow filler (A) is incapable of incorporation in a larger amount than a certain limit and hence the compound with this filler has no possibility of further improvement in the void ratio of sponge, that is, decreasing the heat capacity of cellular rubber.

For the purpose of measuring the thermal conductivity of the cured solid silicone rubber, a composition for unexpanded silicone rubber was prepared in the following way from the same components as above except that the organic resin hollow filler (A) was omitted as in Comparative Example 4. The resulting composition was made into a rubber sheet (6 mm thick), which was examined only for thermal conductivity in its solid state. The results are shown in Table 5.

Comparative Example 6

A silicone rubber composition (13) and a solid rubber composition were prepared from the following components by uniform mixing in a planetary mixer.

100 parts by weight of dimethylpolysiloxane (having a degree of polymerization of about 300), with both terminals blocked with dimethylvinylsiloxy groups 80 parts by weight of metallic silicon powder having an average particle diameter of 5 μm 0.5 parts by weight of hydrophobized fumed silica having a specific surface area of 110 m²/g ("R-972" made by Nippon Aerosil Co., Ltd.)

4.0 parts by weight of methylhydrogenpolysiloxane (1) as a crosslinking agent having Si—H groups on both terminals and side chains, having a degree of polymerization of about 17, and containing Si—H groups in an amount of 0.0030 mol/g, with the ratio of Si—H groups to alkenyl groups being 1.35

5 parts by weight of triethylene glycol 0.05 parts by weight of ethynylcyclohexanol as a reaction inhibiting agent 0.1 parts by weight of platinum catalyst (with the Pt concentration being 1 wt %)

The resulting compositions were examined for various properties in the same way as in Example 1. The results are shown in Table 5.

TABLE 3

|  | Example | | | | |
|---|---|---|---|---|---|
|  | 1 | 2 | 3 | 4 | 5 |
| Organic resin hollow filler | A | A | B | B | A |
| Amount of hollow filler (pbw) | 5.0 | 7.0 | 2.5 | 2.0 | 5.0 |
| Heat-conductive filler | Metallic silicon powder A | Metallic silicon powder A | Metallic silicon powder A | Metallic silicon powder B | Metallic silicon powder A |
| Amount of heat-conductive filler (pbw) | 50 | 50 | 110 | 80 | 70 |
| Density of rubber (g/cm³) | 0.77 | 0.55 | 0.81 | 1.05 | 0.84 |
| Hardness (Asker C) | 45 | 36 | 49 | 52 | 46 |
| Tensile strength (MPa) | 0.8 | 0.5 | 0.4 | 0.9 | 0.8 |
| Permanent compression set (%) | 15 | 14 | 20 | 24 | 16 |
| Thermal conductivity of cellular rubber (W/m · K) | 0.21 | 0.14 | 0.35 | 0.41 | 0.24 |
| Thermal conductivity of solid rubber (W/m · K) | 0.45 | 0.45 | 0.70 | 0.50 | 0.52 |
| Heat capacity of cellular Rubber (J/K) | 0.96 | 0.66 | 0.97 | 1.28 | 1.01 |
| Void ratio (%) | 38 | 54 | 42 | 20 | 37 |

TABLE 4

|  | Example | | |
|---|---|---|---|
|  | 6 | 7 | 8 |
| Organic resin hollow filler | A | A | C |
| Amount of hollow filler (pbw) | 5.0 | 5.0 | 25.0 |
| Heat-conductive filler | Zinc oxide powder A | Alumina powder A | Metallic silicon powder A |
| Amount of heat-conductive filler (pbw) | 140 | 140 | 50 |
| Density of rubber (g/cm³) | 1.43 | 1.18 | 0.98 |
| Hardness (Asker C) | 41 | 43 | 55 |
| Tensile strength (MPa) | 0.4 | 0.6 | 0.8 |
| Permanent compression set (%) | 16 | 19 | 23 |
| Thermal conductivity of cellular rubber (W/m · K) | 0.22 | 0.21 | 0.32 |
| Thermal conductivity of solid rubber (W/m · K) | 0.46 | 0.45 | 0.40 |
| Heat capacity of cellular rubber (J/K) | 1.73 | 1.42 | 1.18 |
| Void ratio (%) | 40 | 38 | 29 |

TABLE 5

| | Comparative Example | | | | | |
|---|---|---|---|---|---|---|
| | 1 | 2 | 3 | 4 | 5 | 6 |
| Organic resin hollow filler | A | A | A | A | A | none |
| Amount of hollow filler (pbw) | 5.0 | 2.5 | 5.0 | 2.5 | 3.5 | — |
| Heat-conductive filler | none | Crystalline silica powder A | Crystalline silica powder A | Crystalline silica powder A | Crystalline silica powder A | Metallic silicon powder B |
| Amount of heat-conductive filler (pbw) | — | 100 | 50 | 120 | 100 | 80 |
| Density of rubber (g/cm$^3$) | 0.51 | 1.21 | 0.69 | *1 | *1 | 1.33 |
| Hardness (Asker C) | 37 | 43 | 41 | *1 | *1 | 62 |
| Tensile strength (MPa) | 0.5 | 0.6 | 0.4 | *1 | *1 | 1.1 |
| Permanent compression set (%) | 9 | 39 | 22 | *1 | *1 | 9 |
| Thermal conductivity of cellular rubber (W/m·K) | 0.09 | 0.31 | 0.14 | *1 | *1 | — |
| Thermal conductivity of solid rubber (W/m·K) | 0.21 | 0.40 | 0.29 | 0.45 | 0.40 | 0.50 |
| Heat capacity of cellular rubber (J/K) | 0.62 | 1.51 | 0.89 | *1 | *1 | 1.60 |
| Void ratio (%) | 48 | 19 | 44 | *1 | *1 | 0 |

*1 The composition before curing was powdery and incapable of processing, and hence no sponge was obtained.

Example 9

The silicone rubber sponge composition (1), which was prepared in Example 1, was filled into the gap between an aluminum shaft, 300 mm long and 20 mm in diameter, which is coated with a liquid silicone rubber primer of addition reaction type ("No. 101 A/B" made by Shin-Etsu Chemical Co., Ltd.), and a fluoroplastic (PFA) tube, 50 μm thick, with primer coating on the inside thereof, which is slipped on the aluminum shaft. The resulting assembly was cured by heating to at 120° C. for 30 minutes, followed by post-curing at 200° C. for four hours. Thus there was obtained a PFA-coated silicone rubber roll measuring 250 mm long and 26 mm in outside diameter.

This roll was installed in a PPC copying machine so that it functions as the fixing roll. The start-up time (or time required for the machine to become ready for printing) was 20 seconds. The fixing roll gave no defective images even for solid black printing at a high speed of 60 ppm raised from the design speed of 30 ppm (paper per minute).

Comparative Example 7

The same procedure as in Example 9 was repeated to produce the PFA-coated silicone rubber roll, except that the silicone rubber sponge composition (1) in Example 1 was replaced by the silicone rubber composition (9) in Comparative Example 1. The result of evaluation indicated that the fixing roll required a start-up time of 18 seconds. In addition, the fixing roll gave defective images (with fuzzy outlines and incomplete toner fusion) in the eleventh and subsequent printing for solid black printing at a high speed of 60 ppm raised from the design speed of 30 ppm.

Comparative Example 8

The same procedure as in Example 9 was repeated to produce the PFA-coated silicone rubber roll, except that the silicone rubber sponge composition (1) in Example 1 was replaced by the silicone rubber sponge composition (10) in Comparative Example 2. The result of evaluation indicated that the fixing roll required a start-up time of 33 seconds. In addition, the fixing roll gave defective images (fuzzy outlines and incomplete toner fusion) probably due to insufficient heater capacity in the start of printing for solid black printing at a high speed of 60 ppm raised from the design speed of 30 ppm.

Japanese Patent Application No. 2010-285605 is incorporated herein by reference.

Although some preferred embodiments have been described, many modifications and variations may be made thereto in light of the above teachings. It is therefore to be understood that the invention may be practiced otherwise than as specifically described without departing from the scope of the appended claims.

The invention claimed is:

1. A toner fixing roll made by curing a thermally conductive silicone rubber sponge composition comprising
   100 parts by weight of a heat-curable organopolysiloxane composition,
   0.1 to 50 parts by weight of an organic resin hollow filler having an average particle diameter of up to 200 μm and a true specific gravity of up to 0.3, and
   20 to 300 parts by weight of a thermally conductive filler having an average particle diameter of 1 to 30 μm and a thermal conductivity of at least 15 W/m·K,
   wherein the silicone rubber sponge obtained by curing said silicone rubber sponge composition has voids accounting for 10 to 70% of the entire volume thereof and has a thermal conductivity ranging from 0.15 to 0.35 W/m·K, and
   wherein the silicone rubber sponge obtained by curing said silicone rubber sponge composition has a heat capacity of up to 1.4 J/K,
   wherein said toner fixing roll is installed in an image forming apparatus of electrophotographic type.

2. The toner fixing roll of claim 1, wherein the heat-curable organopolysiloxane composition consists of:
   (A) 100 parts by weight of an organopolysiloxane having at least two alkenyl groups bonded to silicon atoms in one molecule;
   (B) 0.1 to 50 parts by weight of an organohydrogenpolysiloxane having at least two hydrogen atoms bonded to silicon atoms in one molecule; and
   (C) a platinum group metal catalyst as an addition reaction catalyst in an amount of 0.5 to 1,000 ppm in terms of platinum group metal for the total amount by weight of components (A) and (B).

3. The toner fixing roll of claim 2, further comprising 1 to 30 parts by weight of a polyhydric alcohol or a derivative thereof per 100 parts by weight of component (A).

4. The toner fixing roll of claim 1, wherein the organic resin hollow filler is formed from a polymer obtained by polymerizing or copolymerizing one or more monomers selected from the group consisting of vinylidene chloride, acrylonitrile, methacrylonitrile, acrylates and methacrylates.

5. The toner fixing roll of claim 1, wherein the thermally conductive filler is metallic silicon powder.

6. A thermal fixing roll having a layer of silicone rubber sponge formed on the peripheral surface of a roll shaft, wherein said silicone rubber sponge (i) has voids accounting for 10 to 70% of the entire volume thereof, (ii) has a heat capacity of up to 1.4 J/K, and (iii) has a thermal conductivity ranging from 0.15 to 0.35 W/m·K, and wherein said layer of silicone rubber sponge is formed by curing a thermally conductive silicone rubber sponge composition comprising 100 parts by weight of a heat-curable organopolysiloxane composition, 0.1 to 50 parts by weight of an organic resin hollow filler having an average particle diameter of up to 200 μm and a true specific gravity of up to 0.3, and 20 to 300 parts by weight of a thermally conductive filler having an average particle diameter of 1 to 30 μm and a thermal conductivity of at least 15 W/m·K.

7. A fluoroplastic-coated fixing roll having a fluoroplastics-coated layer through a layer of silicone rubber sponge on the peripheral surface of a roll shaft, wherein said silicone rubber sponge (i) has voids accounting for 10 to 70% of the entire volume thereof, (ii) has a heat capacity of up to 1.4 J/K, and (iii) has a thermal conductivity ranging from 0.15 to 0.35 W/m·K, and wherein said layer of silicone rubber sponge is one which is formed by curing a comprising 100 parts by weight of a heat-curable organopolysiloxane composition, 0.1 to 50 parts by weight of an organic resin hollow filler having an average particle diameter of up to 200 μm and a true specific gravity of up to 0.3, and 20 to 300 parts by weight of a thermally conductive filler having an average particle diameter of 1 to 30 μm and a thermal conductivity of at least 15 W/m·K.

* * * * *